Oct. 27, 1925.
G. V. KING
1,558,816
SLED ATTACHMENT FOR MOTOR DRIVEN VEHICLES
Filed March 7, 1922   3 Sheets-Sheet 3
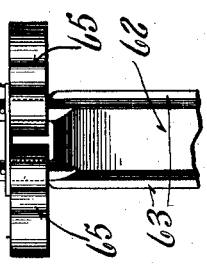
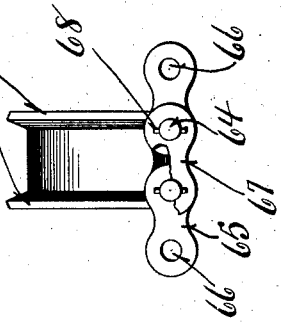
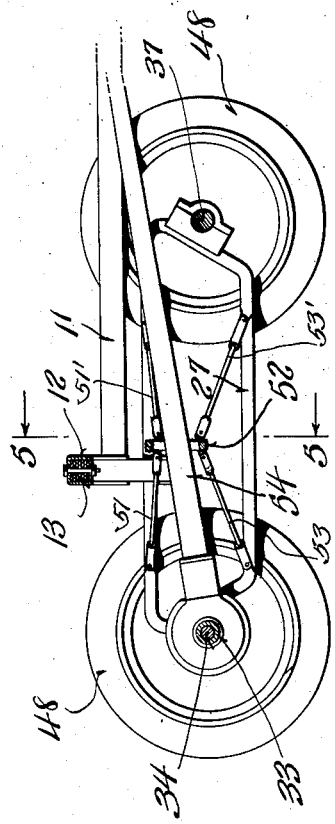
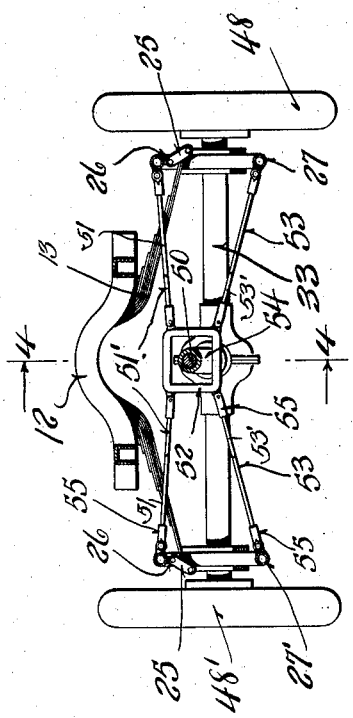
Inventor:
Gilbert V. King
Witness:
R. E. Weber
Attorneys Patented Oct. 27, 1925.

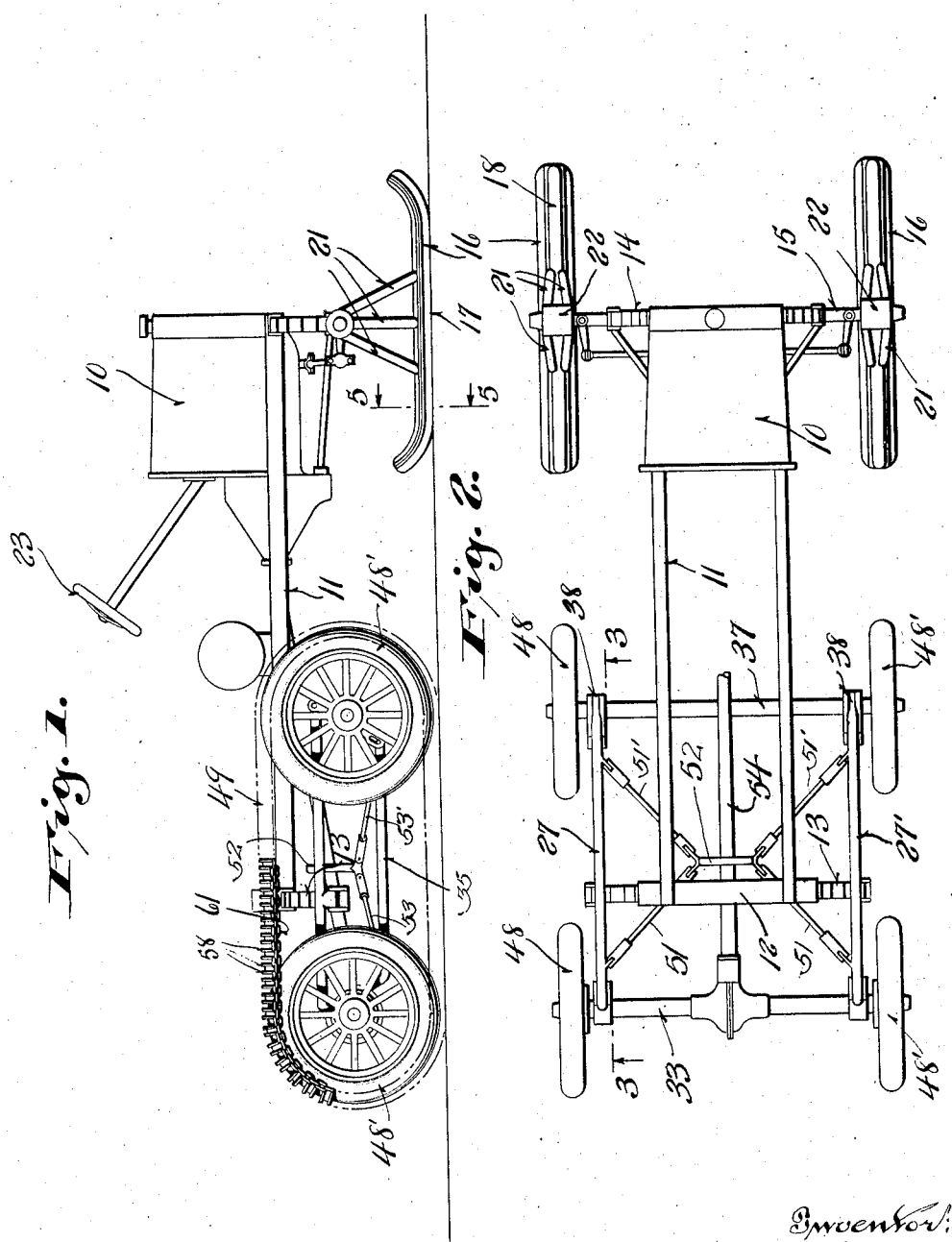

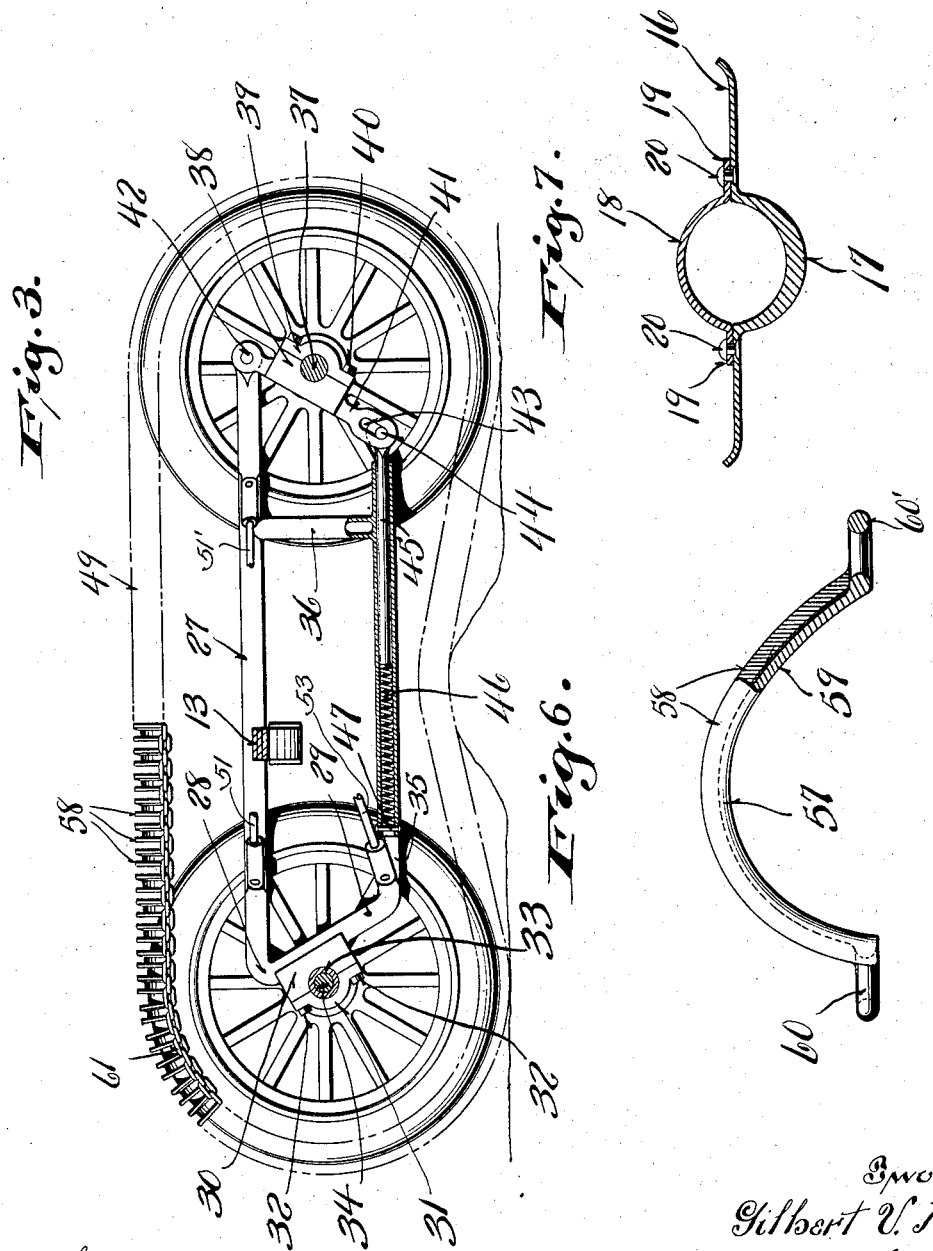

1,558,816

UNITED STATES PATENT OFFICE.

GILBERT V. KING, OF PRINCETON, WISCONSIN.

SLED ATTACHMENT FOR MOTOR-DRIVEN VEHICLES.

Application filed March 7, 1922. Serial No. 541,767.

*To all whom it may concern:*

Be it known that I, GILBERT V. KING, a citizen of the United States, and resident of Princeton, in the county of Green Lake and State of Wisconsin, have invented certain new and useful Improvements in Sled Attachments for Motor-Driven Vehicles; and I do hereby declare that the following is a full, clear, and exact description thereof.

The invention relates to sled attachments for motor driven vehicles.

It comprises an automobile engine and frame rigid therewith, a front axle, runners adapted to be fitted to the ends thereof and cooperating with the steering mechanism in such manner that the driver may steer the vehicle from the wheel, and a four-wheel attachment. The wheels are provided with endless treads and are supported in side frames which are pivoted with respect to a rear axle.

The primary object of the invention is the alteration of common automobile structure and the affixation of runners thereto in suchwise that a vehicle results adapted to move of its own power and to be guided properly by the runners. The device is designed to travel over snow and ice even of a rough and irregular nature at all times being entirely within the control of the driver and being thoroughly reliable in its operation.

An object of the invention is the provision of an endless tread for each of the two wheels on a side of the vehicle. The parts are so constructed that when the fore wheels encounter an obstacle they may move backwardly, shortening the wheel base against the tension of a spring. This shortening of the wheel base will permit considerable deflection of the tread because of roughness of the surface over which the vehicle travels. The side frames which are carried by the wheels are pivoted to the rear axle. The object of this feature is the ready absorption of shock. Irregularities acting upon the front wheels merely swing the frame about the rear axle, the angular movement being relatively small and the shock is not transmitted directly to the main frame.

An important feature of the structure is the provision of transverse braces adapted to strengthen the side frames against forces tending to move them angularly with respect to the axles. The structure is designed generally to withstand the severe shocks to which it is exposed in usage and for this purpose tie rods are extended from frame to frame serving to maintain the frames rigid.

The invention is designed to make the alteration of automobile structure as small as possible and for this purpose the transverse automobile springs affixed to the main frame are utilized.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a side elevation of the invention, the parts being shown somewhat diagrammatically for purposes of clarity.

Figure 2 is substantially a plan view of the parts appearing in Figure 1 without the steering wheel and a few similar parts are removed.

Figure 3 is a vertical section showing the side frame, a pair of wheels and part of the tread, portions of the shock absorbing mechanism being shown in section.

Figure 4 is a vertical section taken on the line 4—4 of Figure 5.

Figure 5 is a section taken on the line 5—5 of Figure 4.

Figure 6 is a detail of a traction lug.

Figure 7 is a transverse section through a runner.

Figures 8 and 9 are details of an alternative form of a traction lug.

Engine 10 is of standard construction and is rigid with a main frame, comprising side strips 11, yoke 12, rear spring 13, front spring 14, and front axle 15. The parts of a Ford automobile are utilized and runners 16 have a downwardly directed longitudinally extending deformation 17. They are braced by a longitudinally extending reinforcement 18 having flat, marginal portions 19 secured by rivets 20 to the runner 16. The central portion of reinforcement 18 is bowed upwardly and rigid with tubular legs 21 affixed to hubs 22 secured to the ends of front axle 15. The steering connections are substantially the same as those in a standard automobile and the rotation of steering wheel 23 is operative to alter the position of runners 16 so that the device is steered readily and conveniently. The length of contact of the runners 16 with the surface of the snow makes the steering action reliable and accurate.

Yoke 12 is rigid with strips 11 and is U-shaped in cross section, housing the central portion of spring 13 which extends transversely of the vehicle and is pivoted to links 25 which incline upwardly and inwardly from its pivotal point and are pivoted at 26 to upper side frame tubes 27—27'. It is apparent that links 25 permit a slight swinging action laterally. The upper side frame tubes 27—27' are deflected downwardly at 28 to provide a rearward side frame tube 29 to which are secured bearing members 30 and 31 which by means of bolts 32 are fitted properly against housing 33 surrounding rear axle 34. The bearing members are capable of rotary movement with respect to housing 33. The rear side frame tube is bent and directed forwardly in a lower side frame tube 35. The upper and lower side frame tubes are spaced apart by spacer 36. On the front axle 37 bearing members 38 and 39 are secured by bolts 40. The bearing members are integral with a link 41 movable on pivot 42 at the end of the upper side frame member. The lower end of link 41 is provided with a longitudinal slot 43 adapted to receive a pin 44 secured to plunger 45, the end of which contacts with spring 46 which is compressed against stop 47, transversely directed through the lower side frame tube 35.

Wheels 48—48' are provided with a pair of endless treads 49. The wheels are of common automobile construction provided with tires and the endless treads extend about each pair of wheels on one side of the machine, and through their instrumentality, traction is produced. As the device is designed to go over rough ground, tread 49 is subjected to deforming conditions. Such a condition, is indicated in dotted lines in Figure 3. When an obstacle is encountered which moves tread 49 upwardly between the front and rear wheels, it is apparent that the wheel base must in some manner be shortened. The excessive tension on tread 49 causes a movement of front axle 37 and the link 41, rearwardly moving the plunger 45 against the tension of spring 46. In this movement, pin 44 is free to move downwardly in slot 43. After the obstacle has been passed over, spring 46 tends to move plunger 45 forwardly. This returns the parts to their normal forward condition.

In the forward movement of link 41, pin 44 is free to move upwardly in slot 43. The tension of tread 49 limits the forward travel of the front axle with respect to the side frames. When the front wheels ride over an obstacle, the side frames pivot on rear axle 34, the main frame riding freely and the shock thereto through spring 13 being greatly reduced.

To prevent the side frames from moving out of their normal vertical positions, that is from moving to an acute angle with respect to the rear axle housing, provision is made for transverse brace rods 51, 51' secured to the upper side frame tubes 27, 27' and a central frame 52. This frame is substantially square and to the lower corners thereof strengthening rods 53, 53' are secured directed downwardly to lower side frame tubes 35. Obviously, the central frame 52 is provided to prevent the brace rods and strengthening rods from interference with torque tube 54, which houses a drive shaft 50. Obviously, the brace rods and the strengthening rods are of adjustable nature, as is common with such rods, and operate to shorten the distance between the side frames, or to space them farther apart as the rods are rotated in threaded sockets 55 by means of a wrench, or some such instrument.

The tread 49 is made up of a large number of traction lugs 57, which are provided with flange 58 transversely extending and being struck up from an intermediate portion 59. The lugs terminate in eyes 60, 60' through which a link 61 is extended for coupling the eye with the next succeeding eye of the adjacent traction lug. Thus an endless chain of lugs is provided.

In Figures 8 and 9, a modification of traction lug is shown, provided with transverse, intermediate portions 62 having integral marginal flanges 63 terminating in studs 64 over which links 65 having eyes 66 are placed, being secured in position by plate 67 abutting against pins 68. The curved or arc shape of the traction shoe, as used in Figure 6, enables it to fit snugly on the tires and prevents lateral movement of the tread thereon even when the machine is subjected to very considerable shock.

It will be observed that eye 60' in Figure 6 is extended farther to one side than eye 60. The object of this construction is to provide a greater traction by reason of the extension which operates to grip the surface of the ice or snow. These lugs are not extended inwardly to an equal distance because of the location of wheels of the vehicle inwardly with respect to the frames and body.

The vehicle is driven substantially in the manner in which an auto is run, the rotation of steering wheel 23 guiding it as desired and the front and rear springs 14 and 13 taking up shocks. It is apparent that the device is reliable at all times and durable. Obviously, also, many of the common automobile parts may be utilized in its construction, the rear wheels, rear axle, and rear axle housing may be taken directly from an automobile and the entire fore part of the machine, with the exception of the runners, is common automobile structure. The front wheels are, also, of such nature as to be taken from an ordinary automobile and adapted to the side frames.

I claim:—

1. In an attachment for a motor-driven vehicle, the combination of a main frame, a pair of side frames resiliently supporting the rear of said main frame from a point on each side frame intermediate its ends, a pair of rear wheels spaced laterally with respect to said main frame, a pair of forward wheels aligning with said rear wheels, a rear axle for said rear wheels, a rear axle housing, said side frames being pivotally carried by said rear axle housing, and a forward axle for said forward wheels, said forward axle being carried by said side frames.

2. In an attachment for a motor-driven vehicle, the combination of a main frame, a pair of side frames resiliently supporting the rear of said main frame from a point on each side frame intermediate its ends, a pair of rear wheels spaced laterally with respect to said main frame, a pair of forward wheels aligning with said rear wheels, a rear axle for said rear wheels, a rear axle housing, said side frames being pivotally carried by said rear axle housing, a forward axle for said forward wheels, said forward axle being carried by said side frames, and said braces directly joining said side frames with each other.

3. In a sled attachment for motor-driven vehicles, the combination of a main frame, a pair of upper side frame members, a pair of lower side frame members, means for securing said upper side frame members to said main frame, a pair of brace rods extending from said upper side frame member, a pair of strengthening rods extending from said lower side frame member, a central frame secured to the inner ends of said brace rods and said strengthening rods, a pair of wheels on each side of said main frame, and means for securing said wheels to said upper and lower side frame members.

4. In a sled attachment for motor driven vehicles, an upper side frame tube, a lower side frame tube, a rearward side frame tube integral with said tubes, a forward link pivoted to said upper side frame tube, an axle secured to said link, and resilient means operative to permit rearward movement of said link for tending to restore said link to a forward position.

5. In a sled attachment for motor-driven vehicles, the combination of an upper side frame member, a lower side frame member, means securing said members together, a link pivoted to said upper side frame member, an axle secured to said link, a spring secured to said lower side frame member and cooperating with said link to maintain said front axle in a forward position.

6. In a sled attachment for motor-driven vehicles, the combination of an upper side frame member, a lower side frame member, means securing said members together, a spring, said lower side frame member having a chamber receiving said spring, a plunger movable in said lower side frame member and contacting with said spring, a link pivoted to said upper side frame member, and means securing said link and said plunger together, whereby said link may be moved rearwardly against the action of said spring and forwardly by the force of said spring.

In testimony that I claim the foregoing I have hereunto set my hand at Milwaukee, in the county of Milwaukee and State of Wisconsin.

GILBERT V. KING